United States Patent
Donath et al.

(10) Patent No.: US 6,643,940 B1
(45) Date of Patent: Nov. 11, 2003

(54) DEVICE FOR HORIZONTAL AND VERTICAL ADJUSTMENT IN GEODETIC DEVICES

(75) Inventors: Bernd Donath, Jena (DE); Wieland Feist, Jena (DE); Wolfgang Hahn, Buergel (DE); Steffen Laabs, Jena (DE); Werner Marx, Jena (DE)

(73) Assignee: ZSP Geodaetische Systeme GmbH, Jena (DE)

( * ) Notice: Subject to any disclaimer, the term of this patent is extended or adjusted under 35 U.S.C. 154(b) by 93 days.

(21) Appl. No.: 09/631,522

(22) Filed: Aug. 3, 2000

(30) Foreign Application Priority Data

Jul. 26, 1999 (DE) ......................... 199 34 931

(51) Int. Cl.[7] ................................ G01C 5/00
(52) U.S. Cl. ........................... 33/290; 33/292
(58) Field of Search ..................... 33/290, 291, 292

(56) References Cited

U.S. PATENT DOCUMENTS

| 341,690 A | * | 5/1886 | Reichenbach | 33/292 |
|---|---|---|---|---|
| 555,231 A | * | 2/1896 | Berger | 33/292 |
| 754,897 A | * | 3/1904 | Russell | 33/292 |
| 1,133,123 A | * | 3/1915 | Geier | 33/292 |
| 2,231,036 A | * | 2/1941 | Suverkrop | 33/292 |
| 2,741,854 A | * | 4/1956 | Jasperson | 33/292 |
| 3,083,464 A | * | 4/1963 | Blydenburgh | 33/290 |
| 3,199,198 A | * | 8/1965 | Arnold | 33/290 |
| 3,404,859 A | * | 10/1968 | Chapman | 33/290 |
| 3,433,571 A | * | 3/1969 | Brunson | 33/290 |
| 3,517,445 A | * | 6/1970 | Harris | 33/290 |
| 3,871,101 A | * | 3/1975 | Becattini et al. | 33/290 |
| 4,031,629 A | * | 6/1977 | Paluck | 33/290 |
| 4,333,242 A | * | 6/1982 | Genho, sr. | 33/290 |
| 5,421,096 A | * | 6/1995 | Ross | 33/290 |
| 5,475,930 A | * | 12/1995 | Kimura | 33/290 |
| 5,887,353 A | * | 3/1999 | Beckingham | 33/292 |
| 5,987,763 A | * | 11/1999 | Ammann et al. | 33/290 |
| 6,055,046 A | * | 4/2000 | Cain | 33/291 |
| 6,076,266 A | * | 6/2000 | Beckingham t al. | 33/292 |

FOREIGN PATENT DOCUMENTS

| JP | 3089107 | * | 4/1991 | ................. 33/290 |
|---|---|---|---|---|

\* cited by examiner

Primary Examiner—Christopher W. Fulton
Assistant Examiner—Travis Reis
(74) Attorney, Agent, or Firm—Reed Smith LLP

(57) ABSTRACT

A device for horizontal and vertical adjustment in geodetic devices comprises within its housing, a horizontal adjusting system comprising a first fine adjustment drive for rotation of the device about a vertical standing axis and a vertical adjusting system comprising a second fine adjustment drive for the movement of a telescope which is mounted in the support of the device so as to be swivelable about a horizontal tilt axis. A coaxial drive, known per se, is arranged at the support of the device and has two coaxially mounted shafts, each having a rotating knob, for initiating the rotation and/or movement of the respective parts and subassemblies. Each of the two fine adjustment gear units comprises a worm and a worm gear with a friction clutch and can be actuated jointly from a location for generating movement in two movement directions running vertical to one another or at an angle to one another. These fine adjustment gear units are arranged in two planes situated at different heights in the housing of the device, wherein the worm of one of these two fine adjustment gear units lies in the plane of the coaxial drive and each worm gear of these two fine adjustment gear units is connected, via a friction clutch, with the part or subassembly to be moved or rotated. The fine adjustment gear unit whose worm does not lie in the plane of the coaxial drive is in an operative connection, via a quarter-turn belt drive, with one of the shafts of the coaxial drive.

9 Claims, 3 Drawing Sheets

DEVICE FOR HORIZONTAL AND VERTICAL ADJUSTMENT IN GEODETIC DEVICES

BACKGROUND OF THE INVENTION a) Field of the Invention

The invention is directed to a device for horizontal and vertical adjustment in geodetic devices, especially in theodolites and tacheometers, which enables precise sighting adjustments, e.g., of the telescope of these devices.

In particular, this concerns the adjusting gear units for the sighting adjustment for the Hz (horizontal) and V (vertical) directions of the telescope of a tacheometer or theodolite.

b) Description of the Related Art

In older geodetic devices, simple mechanical gear units were provided, by means of which the corresponding movements were carried out for every adjusting direction (Hz or V), e.g., for rotation of the alidade about the vertical or standing axis and for rotation of the telescope about the tilt axis, by actuating a handle, usually in the form of a rotating knob. Generally, this involves a simple screw which is supported at a fixed fine adjustment lever and contained by a counterspring buffer, this fine adjustment lever being connected with the structural component part of the device to be moved. To simplify handling, the two movement directions of the two rotating axes (standing axis and tilt axis), which movement directions are at right angles to one another, were combined in a coaxial drive by means of a complicated mechanical lever gear unit. It was also necessary to clamp both movement directions (Jenaer Rundschau, Vol. 19 (1974), Issue 1, pages 13 to 15, Illustrations 1 and 2).

In leveling devices, a simple and quick, but imprecise, rotation about the standing axis was necessary in order to swivel the telescope quickly from one stadia setting to the next. For this purpose, the slip clutch was introduced for coarse adjustment and the worm gear, with worm, was introduced for fine adjustment. A prerequisite for this is that the tripod, with its foot screws, possesses a certain directional stability. This is of secondary importance for leveling. For theodolites, this influence is not negligible. For this reason and in view of the fact that sensitivity of the sighting adjustment can be realized only with difficulty, the system of the slip clutch with worm and worm gear was not previously widely used in theodolites (system in all compensator leveling).

By replacing the mechanical drive with motor control systems and sacrificing a certain quality of sighting adjustment, the slip clutch with worm gear and worm was also introduced in electronic tacheometers for rotation of the alidade about the standing axis and for rotation of the telescope about the tilt axis. Because of the advantageous operation, such combinations of slip clutch, also with hand-operated mechanical adjusting gear units, are now in demand (Deumlich, "Instrumentenkunde der Vermessungstechnik [Instrumentation in Surveying Technology]", Verlag der Technik Berlin 1974, pages 87 and 88).

In order to achieve the necessary sensitivity, the worm is arranged following a screw in a second stage which accordingly forms a coarse-fine adjustment gear unit. A system of this kind is shown, for example, in U.S. Pat. No. 5,689,892 for the adjusting movement of the telescope of a theodolite. This system has the disadvantage that the two gear unit stages are arranged one behind the other and slackness occurs in the bearings, causing a disadvantageous backlash width.

Another patent, U.S. Pat. No. 5,475,930, is known from the complex of adjusting gear units for tacheometers and theodolites. This is a motor control system with a gear unit which uses a toothed belt for transmitting movement between two parallel axes.

OBJECT AND SUMMARY OF THE INVENTION

It is the primary object of the invention to provide a device for horizontal and vertical adjustments of elements and subassemblies in geodetic devices which is particularly simple in technical respects and which reliably enables a rotation of the alidade about the standing axis and the rotation of the telescope about the tilt axis in an ergonomically favorable manner proceeding from a location with great accuracy and sensitivity. At the same time, however, a quick coarse sighting adjustment is to be realized without having to loosen a clamp or close it again before precise sighting adjustment as is known in the prior art.

This object is met according to the invention in a device for horizontal and vertical adjustment in geodetic devices comprises a device for horizontal and vertical adjustment in geodetic devices comprises within its housing, a horizontal adjusting system comprising a first fine adjustment drive for rotation of the device about a vertical standing axis and a vertical adjusting system comprising a second fine adjustment drive for the movement of a telescope which is mounted in the support of the device so as to be swivelable about a horizontal tilt axis. A coaxial drive, known per se, is arranged at the support of the device and has two coaxially mounted shafts, each having a rotating knob, for initiating the rotation and/or movement of the respective parts and subassemblies. Each of the two fine adjustment gear units comprises a worm and a worm gear with a friction clutch and can be actuated jointly from a location for generating movement in two movement directions running vertical to one another or at an angle to one another. These fine adjustment gear units are arranged in two planes situated at different heights in the housing of the device, wherein the worm of one of these two fine adjustment gear units lies in the plane of the coaxial drive and each worm gear of these two fine adjustment gear units is connected, via a friction clutch, with the part or subassembly to be moved or rotated. The fine adjustment gear unit whose worm does not lie in the plane of the coaxial drive is in an operative connection, via a quarter-turn belt drive, with one of the shafts of the coaxial drive.

With respect to the belt drive, it is advantageous when a flat belt or toothed belt is provided which connects a first belt pulley fixedly arranged on one of the two shafts of the coaxial drive with a second belt pulley which is arranged on the shaft carrying the worm of one of the two fine adjustment gear units.

For this purpose, a first shaft of the coaxial drive is connected with the worm of the fine adjustment gear unit causing the rotation about the standing axis. A second shaft of the coaxial drive which is mounted in bearings on the first shaft so as to be rotatable relative to it carries the first belt pulley. The second belt pulley is fixedly arranged on a shaft carrying the worm of the fine adjustment gear unit causing the rotation of the telescope about the tilt axis. A structurally simple connection realizing the movement transmission between the belt pulleys results when the first and the second belt pulley are in an operative connection by means of a half-cross or quarter-turn flat belt or toothed belt. A movement transmission which is free of slip can be realized in particular through the toothed belt. It is advantageous when the first belt pulley is arranged on the second shaft of the coaxial drive.

In order to achieve a force transmission and movement transmission in both directions between the worms and the associated worm gears so as to be free from slack, it is advantageous when the worms are pressed against the respective worm gear in such a way by springs or spring-mounted elements arranged in the respective bearing block that the teeth mesh with one another without play and so as to be free from backlash.

The second shaft of the coaxial drive is advantageously constructed as a hollow shaft in which the first shaft of the coaxial drive is arranged so as to be mounted in rolling bearings, so that a particularly favorable space-saving construction results.

It is further advantageous when the friction clutch or slip clutch connecting the worm gears with the associated part or subassembly to be moved is adjustable with respect to its friction torque. This can be carried out in a known manner by changing the force pressing the friction disks together.

In order to achieve a slip-free, angularly conforming movement transmission between the parts and subassemblies, a slip-free, angularly conforming coupling, advantageously a mechanical coupling, compensating for axial offset is provided between the worm of the horizontal adjusting system and the shaft of the coaxial drive driving this worm.

For example, a coupling in the form of a flex joint, a spring shaft, a web coupling or toothed coupling or a flex rod can advantageously be provided between the worm of the horizontal adjusting system and its axially arranged drive shaft.

The invention will be explained more fully in the following with reference to an embodiment example.

BRIEF DESCRIPTION OF THE DRAWINGS

In the drawings:

FIG. 2a illustrates details of the bearing arrangement of the worm of the horizontal adjusting system.

DESCRIPTION OF THE PREFERRED EMBODIMENTS

Figure 1:
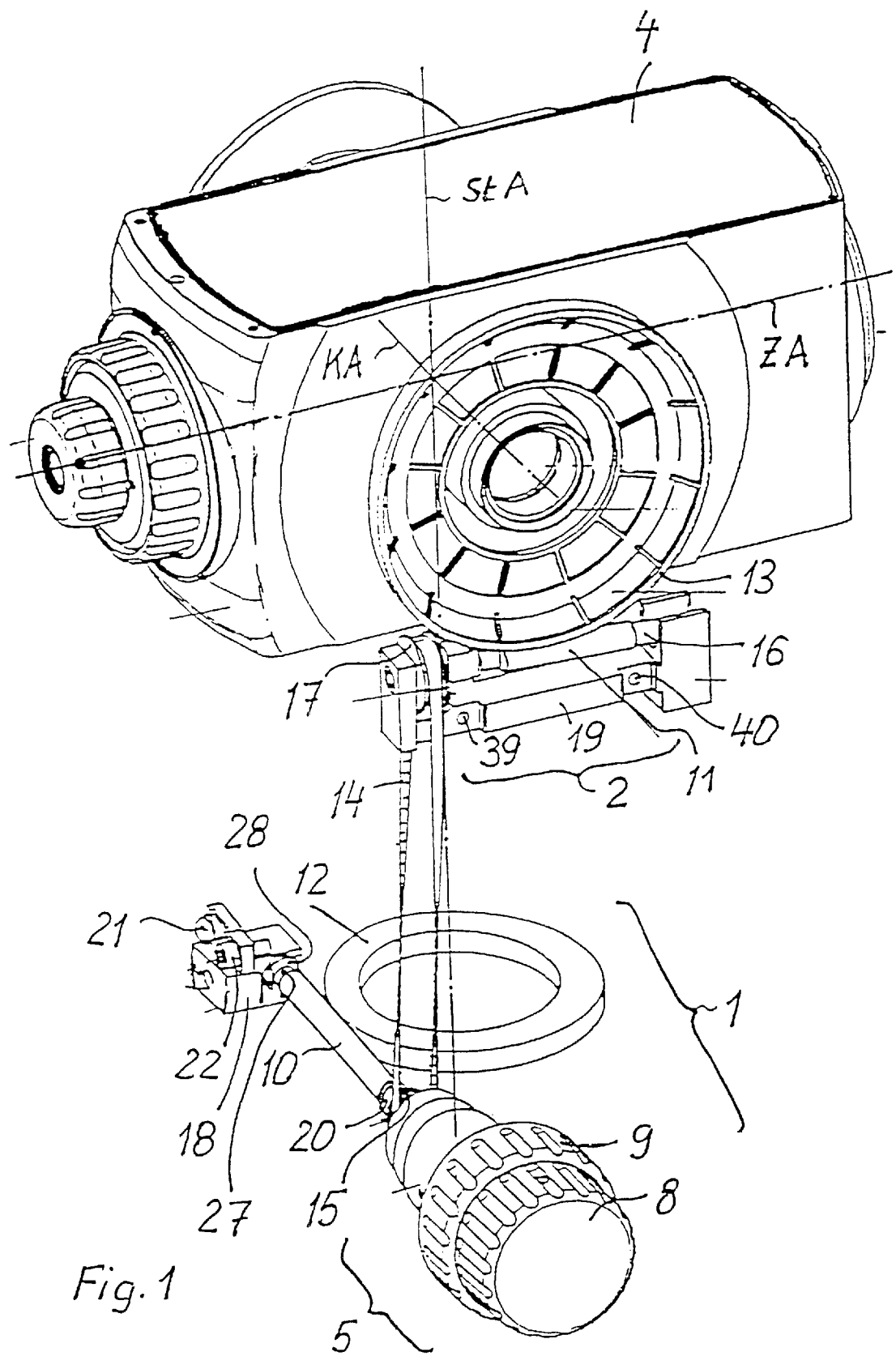
FIG. 1 shows a simplified overall view of the device.

The overall view of the device according to the invention for horizontal and vertical adjustment in geodetic devices, especially in theodolites and tacheometers, shown in FIG. 1 shows the three principal axes of the device, the vertical standing axis StA, the horizontal tilt axis KA at right angles to the latter, and the sighting axis ZA, all of which axes intersect at one point. Thus, the entire device is rotatable about the standing axis StA in the horizontal plane. The telescope of the geodetic device is swiveled about the tilt axis KA in the vertical plane, and the sighting axis ZA indicates the direction to the sighted terrain point. For the sake of clarity, the housing of the device and other parts are not shown in FIG. 1 in order to show more clearly the components which characterize the invention.

In its housing, the geodetic device comprises a horizontal adjusting system 1 comprising a first fine adjustment gear unit for rotation of the device about a vertical standing axis StA and a vertical adjusting system 2 comprising a second fine adjustment gear unit for the movement of a telescope 4 which is mounted in the support 3 (FIG. 3) of the device so as to be swivelable about a horizontal tilt axis KA. A coaxial drive 5, known per se, which is arranged at the support 3 of the device and has two coaxially mounted shafts 6 and 7, each having a rotating knob 8 and 9, respectively (FIG. 2), is provided for initiating the rotation and/or movement of the respective parts and subassemblies.

Each of the two fine adjustment gear units comprises a worm gear unit formed of a worm 10; 11 and a worm gear 12; 13. The worm gears 12 and 13 are connected with the part or subassembly to be moved by them, e.g., the telescope 4, by a friction clutch or slip clutch. These fine adjustment gear units are arranged in two planes situated at different heights in the housing of the device, wherein the worm 10 of one of these fine adjustment gear units, namely, of the horizontal adjusting system, lies in the plane of the coaxial drive. The fine adjustment gear unit, that of the vertical adjusting system in the present example, which does not lie in the plane of the coaxial drive is in an operative connection, via a quarter-turn belt drive 14, with the shaft 7 of the coaxial drive driving the worm 11. A flat belt or toothed belt, for example, can be provided as belt drive 14, wherein the toothed belt has the advantage that it enables movement transmission without slip. The belt drive 14 connects a first belt pulley 15 arranged on shaft 7 with a second belt pulley 17 arranged on the shaft 16 carrying the worm 11.

Figure 2:
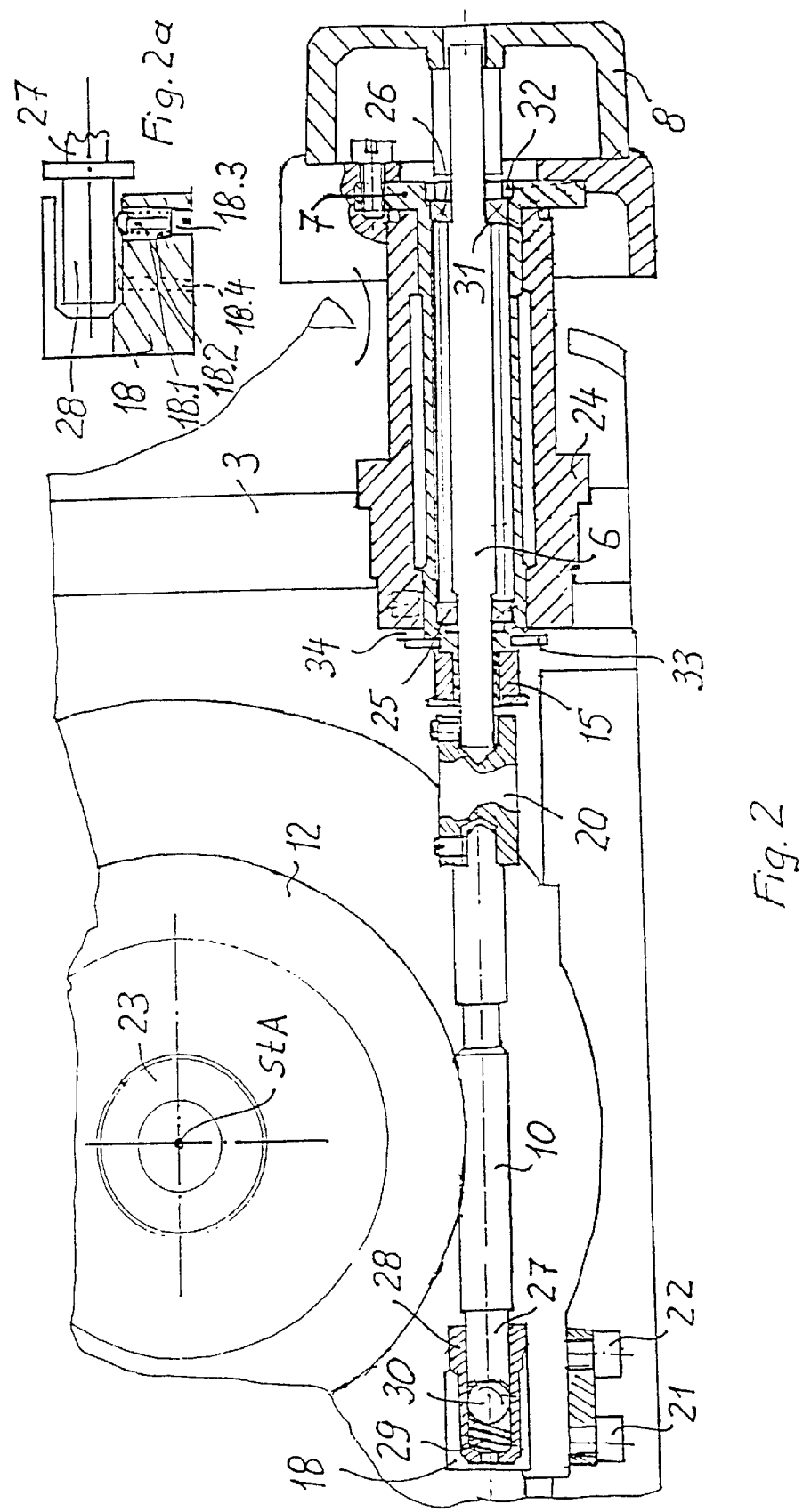
FIG. 2 shows a view of the horizontal adjusting system.

Further, as can be seen from FIG. 1, the worm 10 is mounted at one end in a bearing block 18, the other end of the worm 10 being connected with a coupling 20 (FIG. 2). The worm 11 of the vertical adjusting system 2 is mounted at both sides in a bearing block 19. The bearing blocks 18 and 19 are fixedly arranged in the support 3 of the device (not shown in detail in the drawing). The screws 21 and 22 are provided for this purpose. The bearing supports for the two worms 10 and 11 are described more fully in connection with the description of FIGS. 2 and 3.

FIG. 2 shows a simplified view of the construction of the horizontal adjusting system. The worm gear 12 which is connected, via a friction clutch (described more fully with reference to FIG. 3), with the part to be moved is arranged concentric to the standing axis StA.

The support 3 fits on the standing axis system 23, the worm gear 12 being arranged concentric to the latter. The standing axis StA, as vertical axis of rotation, is arranged centrically in the standing axis system 23. A bushing 24 receiving the coaxial drive 5 is screwed into the support 3. The coaxial drive 5 comprises the shafts 6 and 7 on which the rotating knobs 8 and 9 are arranged as handles. Accordingly, the rotating knob 8 is arranged on the first shaft 6 and serves to introduce the movement for the horizontal adjustment of the device about the standing axis StA. The rotating movement of the shaft 6 is transmitted via a coupling 20 to the worm 10 which is supported at the fixed worm gear 12 and engages with the latter, and the support 3 rotates about the standing axis StA.

The coupling 20 which connects the shaft 6 with the worm 10 is constructed as a flex joint, a spring shaft, a web coupling or toothed coupling or a flex rod and must be made in such a way that an optimally slip-free and angularly conforming movement transmission is realized. It is also advantageous when this coupling 20 is constructed in such a way that an offset of the axes of the worm 10 and shaft 6 can be compensated.

The second shaft 7 is constructed as a hollow shaft, carries the rotating knob 9 and is mounted so as to be rotatable in the bushing 24 which is inserted into the support 3. The shaft 6 is preferably mounted in rolling bearings 25 and 26 inside the shaft 7 so as to be rotatable relative to the shaft 7. For one, it is achieved in this way that the shafts 6 and 7 do not influence one another during operation. The first belt pulley 15 is fixedly attached, advantageously glued, to the shaft 7. Accordingly, by means of the shaft 7, the belt drive 14 can be actuated via the first belt pulley 15 and the worm 11 and the worm gear 13 of the vertical adjusting system 2 can be actuated via the second belt pulley 17, and the telescope 4 is therefore adjustable in the vertical plane.

The rotating knob 8 is located at one end of the shaft 6, while the coupling 20 connecting the shaft 6 with the worm 10 engages at the other end. The end 27 of the worm 10 remote of the shaft 6 is mounted in a bearing bush 28 arranged in the bearing block 18 and is acted upon axially by spring force by means of a spring 29 via the ball 30 in the bearing bush 28. The bearing bush 28 is pressed against the worm gear 12, likewise by a spring (not shown), wherein the force of this spring can be adjusted in a known manner by a screw, not shown. The axial pressure exerted on the ball 29 by the spring 29 continues via the worm 10 and the coupling 20 to the axis of rotation 6 and is contained by the rolling bearings 25 and 26 as a result of a shoulder 31 of the shaft 6 pressing against the ball bearing 26. The ball bearing 26 is supported, in turn, against a retainer ring 32 in the hollow shaft 7 and the latter is pressed axially via a shaft retaining ring 33 and adjusting washer 34 against the bushing 24 of the coaxial drive which, in turn, is screwed into the support 3. The above-mentioned adjusting process is necessary to reduce axial play in the functional chain described above and to ensure the smooth running of the entire gear unit at the same time. However, axial play can also be eliminated by a spring, for example, by a wave spring, at the location of the adjusting washer 34.

When the rotating knob 8 is turned, the support 3 is moved around the vertical standing axis StA via the worm 10 and the worm gear 12 engaging therewith. When rotating knob 9 is turned, the first belt pulley 15 rotates in an analogous manner and accordingly moves the belt drive 14 and, as was already described above, the telescope 4 is accordingly swiveled in the vertical plane via the vertical adjusting system 2.

FIG. 2a shows details of the bearing block 18 of the horizontal adjusting system 1. A tappet 18.1 is provided in a bore hole for advancing the worm 10 to the worm wheel 12 in the bearing block 18, this tappet 18.1 being pressed by a spring 18.2 against the bearing bushing 28 receiving the shaft of the worm 10. The spring force of the spring 18.2 is adjustable by means of an adjusting screw 18.3. In this simple manner, it is ensured that the worm 10 always engages in the worm gear 12 without play and transmission of movement without slack is accordingly made possible. A limiting pin 18.4 prevents the worm 10 from lifting out of the toothing of the worm gear 12.

Figure 3:
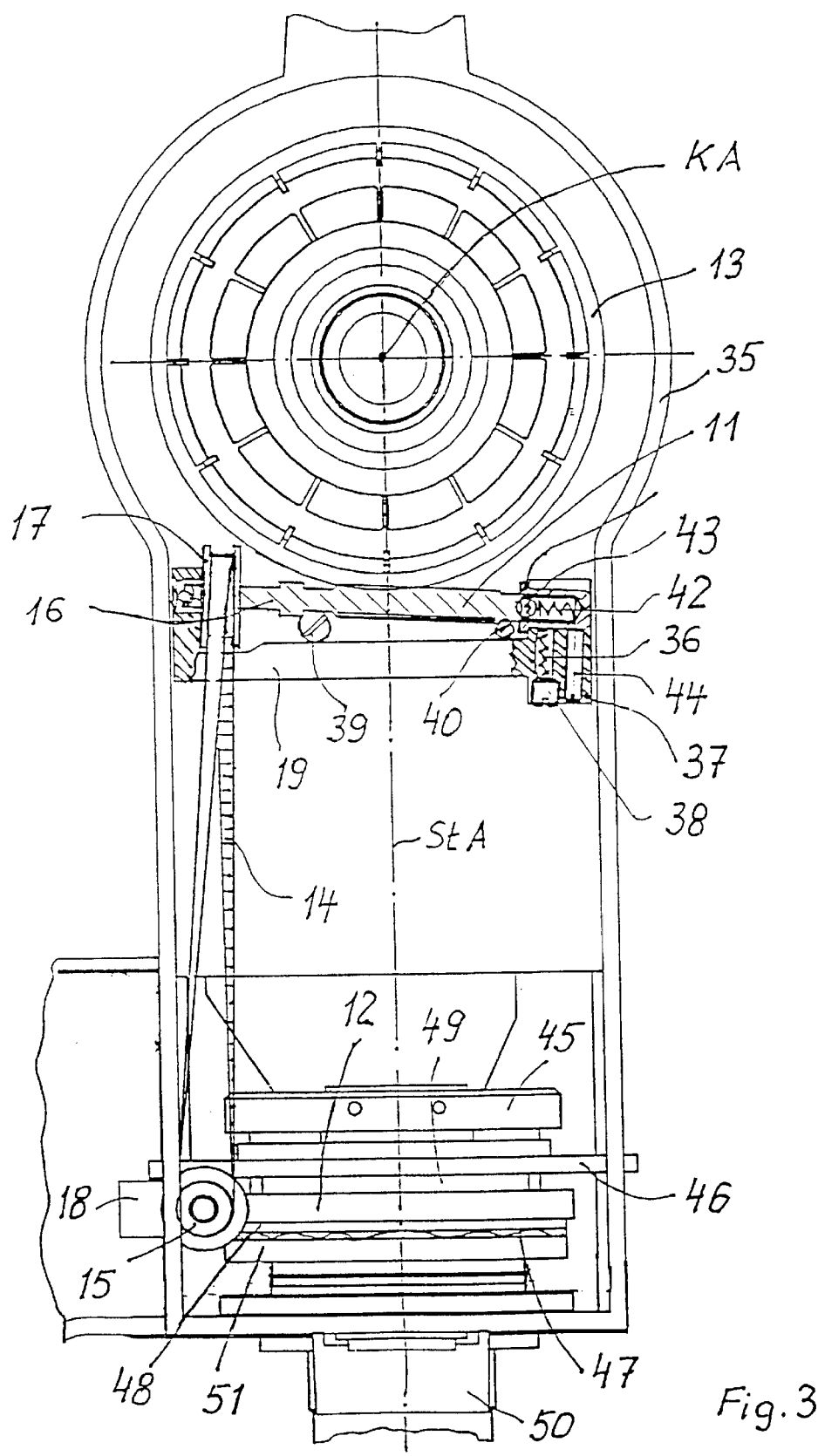
FIG. 3 shows a view of the vertical adjusting system with the connection to the coaxial rotating knob.

FIG. 3 shows the vertical adjusting system 2 with its connection to the coaxial drive 5. A cross section through a supporting arm 35 connected with the support 3 is shown. The vertical adjusting system 2 is visible in the upper part of the supporting arm 35. A friction clutch or slip clutch, not shown in detail, is arranged on the tilt axis KA and connects the worm gear 13 with the telescope 4 to be moved. The slip clutch is constructed analogous to the slip clutch or friction clutch, described below, for the horizontal adjusting system 1. At the worm gear 13 which is mounted so as to be rotatable about the tilt axis KA, the worm 11 which is mounted in a bushing 41 of the bearing block 19 is pressed against the worm gear 13 by the force of a spring 36 which is arranged in the right-hand part 37 of the bearing block 19 in order to achieve a worm drive which is free of play and free of backlash. The force of the spring 36 is advantageously adjustable by means of a screw 38 in part 37. The bearing block 19 is advantageously fastened to the supporting arm 35 by screws 39; 40. The worm 11 is mounted in the bushing 41 at the right-hand part 37 of the bearing block 19 and is axially loaded by the force of a spring 42 by the intermediary of a ball 43. The belt pulley 17 is fixedly arranged on the shaft 16 with the worm 11. The worm shaft 16 with the worm 11 is adjusted by a screw 44 in such a way that the worm 11 is prevented from lifting out of the toothing of the worm gear 13.

When a rotating movement is initiated by the rotating knob 9, the first belt pulley 15 transports the belt drive 14 and rotates the belt pulley 17 of the vertical adjusting system 2 arranged on the shaft 16. The worm 11 is accordingly rotated and therefore causes the rotation of the worm gear 13 and accordingly the swiveling of the telescope 4 about the horizontal tilt axis KA.

The standing axis system of the geodetic device and the construction of the friction clutch or slip clutch is shown in the lower part of FIG. 3 in a cross-sectional view through the support 3. The standing axis plate 45 of the standing axis StA to which the support 3 is screwed is shown here. The horizontal circle 46 and the worm gear 12 are arranged below this, concentric to the standing axis StA. This worm gear 12 is pressed against the flange 49 of the standing axis bushing in an adjustable manner by an adjusting ring 51, for example, via a wave spring 47 and a bearing race or running ring 48, in order to realize the correct torque of the friction clutch or slip clutch.

As was described above with reference to FIG. 2, the worm 10 is pressed against the worm gear 12. The standing axis system 23 fits in a center pin 50 of the device in which the standing axis StA is centrically located.

While the foregoing description and drawings represent the preferred embodiments of the present invention, it will be obvious to one skilled in the art that various changes and modifications may be made therein without departing from the true spirit and scope of the present invention.

REFERENCE NUMBERS 1 horizontal adjusting system
2 vertical adjusting system
3 support
4 telescope
5 coaxial drive
6 first shaft
7 second shaft
8 rotating knob
9 rotating knob
10 worm
11 worm
12 worm gear
13 worm gear
14 belt drive
15 first belt pulley
16 shaft
17 second belt pulley
18 bearing block
18.1 tappet
18.2 spring
18.3 adjusting screw
18.4 limiting pin
19 bearing block 20 coupling
21 screw
22 screw
23 standing axis system
24 bushing
25 rolling bearing
26 rolling bearing
27 end
28 bearing bushing
29 spring
30 ball
31 shoulder
32 retainer ring
33 shaft retaining ring
34 adjusting washer
35 supporting arm
36 spring
37 right-hand part
38 screw
39 screw
40 screw
41 bushing
42 spring
43 ball
44 screw
45 standing axis plate
46 horizontal circle
47 wave spring
48 running ring
49 flange
50 center pin
51 adjusting ring

What is claimed is:

1. A device for horizontal and vertical adjustment in geodetic devices comprising within its housing:

a horizontal adjusting system including a first fine adjustment drive for rotation of the device about a vertical standing axis;

a vertical adjusting system including a second fine adjustment drive for the movement of a telescope which is mounted in a support of the device so as to be swivelable about a horizontal tilt axis;

a coaxial drive which is arranged at the support of the device and having two coaxially mounted shafts, each having a manually operated non-motorized rotating knob structured for driving the rotation and/or movement of the respective parts and subassemblies;

said first fine adjustment drive and the second fine adjustment drive each comprising a worm and a worm gear with a friction clutch, wherein the said fine adjustment drives can be actuated jointly from a location for generating movement in two movement directions running vertical to one another or at an angle to one another;

said fine adjustment drives being arranged in two planes situated at different heights in the housing of the device, wherein the worm of one of said two fine adjustment drives lies in the plane of the coaxial drive;

each worm gear of said two fine adjustment drives being connected, via a friction clutch, with the part or subassembly to be moved or rotated; and said fine adjustment gear unit whose worm does not lie in the plane of the coaxial drive being in an operative connection, via a quarter-turn belt drive, with one of the shafts of the coaxial drive.

2. The device according to claim 1, wherein, with respect to the belt drive, a flat belt or toothed belt is provided which connects a first belt pulley fixedly arranged on one of the two shafts of the coaxial drive with a second belt pulley which is arranged on the shaft carrying the worm of one of the two fine adjustment drives.

3. The device according to claim 1, wherein a first shaft of the coaxial drive is connected with the worm of one of the fine adjustment drives causing the rotation about the standing axis, in that a second shaft of the coaxial drive which is mounted in bearings on the first shaft so as to be rotatable relative to the first shaft carries a first belt pulley, wherein a second belt pulley is fixedly arranged on a shaft carrying the worm of the fine adjustment gear unit causing the rotation of the telescope about the tilt axis, and wherein the first and the second belt pulley are in an operative connection by means of the quarter-turn flat belt or toothed belt.

4. The device according to claim 1, wherein the first belt pulley is arranged on the second shaft of the coaxial drive.

5. The device according to claim 1, wherein the worms are pressed without play against the respective worm gear by springs arranged in a bearing block.

6. The device according to claim 1, wherein the second shaft of the coaxial drive is constructed as a hollow shaft in which the first shaft of the coaxial drive is arranged so as to be mounted in rolling bearings.

7. The device according to claim 1, wherein the friction clutch connecting the worm gears with the associated part or subassembly to be moved is adjustable with respect to its friction torque.

8. The device according to claim 1, wherein a coupling compensating for axial offset and realizing a slip-free, angularly conforming movement transmission is provided between the worm of the horizontal adjusting system and the shaft of the coaxial drive driving this worm.

9. The device according to claim 8, wherein a coupling in the form of a flex joint, a spring shaft, a web coupling or toothed coupling or a flex rod is provided between the worm of the horizontal adjusting system and its axially arranged drive shaft.

* * * * *